Oct. 15, 1957    W. FRANTZ ET AL    2,809,658
VALVED COUPLING
Filed April 16, 1953

INVENTORS.
William Frantz
BY John Joseph Cihi

Churchill, Rich, Weymouth & Engel
ATTORNEYS.

United States Patent Office 2,809,658
Patented Oct. 15, 1957

2,809,658
VALVED COUPLING

William Frantz, Bronxville, and John Joseph Cihi, Yonkers, N. Y., assignors to Simmonds Aerocessories, Inc., Tarrytown, N. Y., a corporation of New York Application April 16, 1953, Serial No. 349,168

2 Claims. (Cl. 137—498)

This invention relates to valved couplings, and more particularly to couplings for high pressure systems adapted, but not necessarily limited, to aircraft oxygen systems.

Oxygen systems in aircraft generally include a cylinder containing oxygen under super-atmospheric pressure and conduits, couplings, fittings and the like, usually under the control of the pilot, for piping the oxygen to the locale of use. In such systems, when an operator or the pilot disconnects the line at the coupling there may be a sudden outrush of oxygen due to the release of the volume stored downstream from the point of disconnection, giving rise to a high local concentration of oxygen in the aircraft compartment which might result in an explosion due to conditions of static electricity or other means of ignition. The outrush through the removable end of a fitting on a hose may also give rise to a whipping action which may cause damage to articles in the environment or even physical injury to the operator.

It is accordingly an object of this invention to provide the withdrawable unit of a valved coupling with means for obviating the aforementioned objections. A further object of the invention is to provide a simple, novel and inexpensive withdrawable coupling unit which will effectively perform the function of accomplishing the aforementioned object.

The foregoing and other objects of the invention not specifically enumerated we accomplish by providing a withdrawable unit of a valved coupling having a casing formed with a bore therethrough within which is disposed a spring-biased valve normally held in unseated position, said valve having a bleeding orifice therethrough for reducing the backflow through said unit upon disconnecting the coupling. The withdrawable unit of the coupling may also be utilized in refilling the oxygen cylinder through the valve coupling assembly. The invention and the advantages realized thereby will be readily understood by persons skilled in the art from the detailed description which follows, when considered in conjunction with the accompanying drawings showing a preferred illustrative embodiment, wherein:

Figure 1:
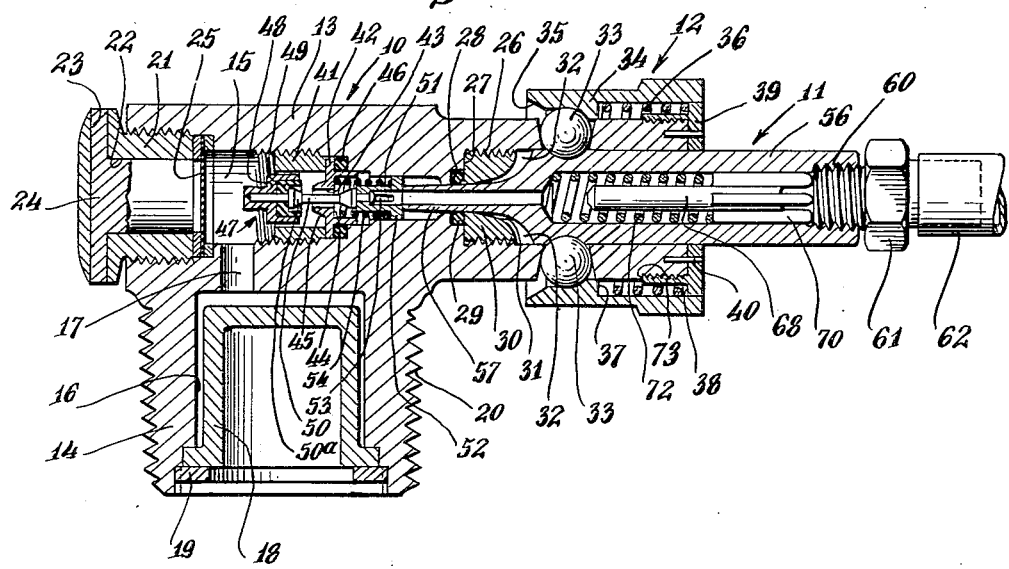
Figure 1 is an axial section through a valved coupling embodying our invention.
Figure 2:
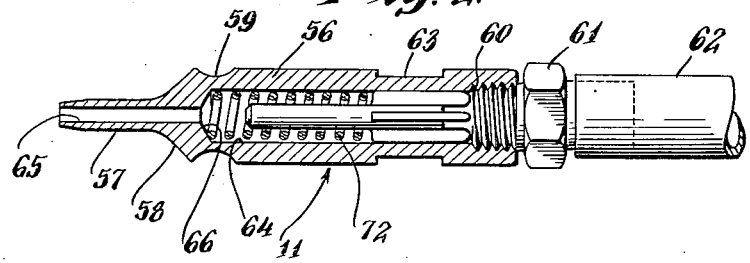
Fig. 2 is an axial section through the withdrawable male coupling unit.
Figure 3:
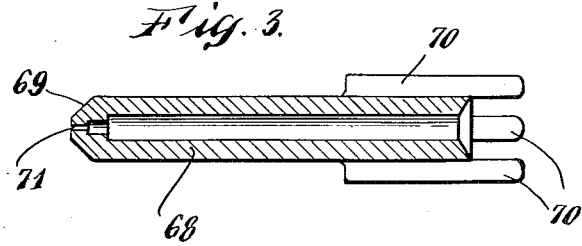
Fig. 3 is an axial section through the plunger valve of the withdrawable coupling unit.
Figure 4:
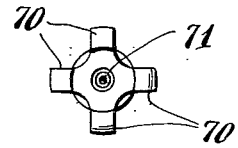
Fig. 4 is an end elevation of the valve element shown in Fig. 3.

Referring to the drawings, the valved coupling may be said to consist of a female coupling unit 10 and a male coupling unit 11, the latter being insertable into and withdrawable from the female coupling unit through the agency of a quick-detachable locking means 12.

The female coupling unit 10 comprises an L-shaped casing having a long arm 13 and a short arm 14, the arm 13 being provided with a valve chamber 15 and the arm 14 being provided with a socket 16 which communicates with the valve chamber through a duct 17. Mounted within the socket 16 in spaced relation to the walls thereof is a sintered metal filtering cup 18 which is held in place by a locking ring 19. The short arm 14 of the casing may be detachably connected to an oxygen cylinder or the like (not shown) by any suitable means, such for example, by external threads 20 formed on the arm 14. The valve chamber 15 is closed off at one end of the long arm 13 by a plug 21 having an axial passage 22 and radial passages 23, which passages are filled with a low melting point fusible metal 24, the plug serving to hold a frangible metal disc 25 in place. The arm 13 at its opposite end is formed with an enlarged bore 26 terminating inwardly from its outer end in shoulders 27 and 28 to provide a seating for an O-ring packing 29 which is held in place by a plug 30 having an internal conical bore 31. The arm 13 intermediate the plug 30 and said opposite end of the casing is formed with a plurality of radial, inwardly-tapered holes 32 so dimensioned to accommodate and retain locking balls 33 therein to a depth where they will protrude into the bore of the casing. The locking balls are normally urged inwardly by a locking sleeve 34 having a cam face 35, said sleeve being biased to move the balls inwardly by a helical coil-spring 36 which is mounted between a shoulder 37 within the sleeve and a shoulder 38 formed on a ring 39 threaded into the end of the casing and locked by pins or equivalent means 40.

Mounted within the valve chamber 15 by a screw-threaded sleeve 41 is a valve seat member 42 having an axial passage 43 therethrough formed with a shoulder 44, the seating face of the valve seat member being conical, as indicated at 45. To provide a leak-tight seal between the valve seat member and the casing arm 13 there is provided an O-ring packing 46.

Also mounted in the valve chamber 15 is a check valve 47, herein shown as consisting of a cup-shaped member 48 containing a deformable valve cup 49 preferably formed of Teflon, Kel-F or equivalent synthetic plastic composition, the latter being held within the cup 48 by an enlargement 50a on a valve pin 50 which extends through the cup 48 and is suitably secured thereto. The valve pin 50 at its opposite end carries a hollow, cup-shaped member 51 having an overhanging flange 52 and lateral passages 53. To normally hold the check valve in seating relation there is provided a helical spring 54, one end of which seats against the shoulder 44 on the valve seat member and the other end against the shoulder provided by the overhanging flange 52.

The male coupling member 11 comprises a hollow, generally cylindrical casing 56 formed at one end with a reduced tubular portion 57 which, with the cylindrical portion proper forms a conical shoulder 58. Adjacent the conical shoulder the casing 56 is formed with an annular, arcuate groove 59 having a radius of curvature substantially equal to the radius of the balls 33. At its opposite end the casing 56 is internally threaded as shown at 60 to accommodate coupling 61 to which is connected a flexible hose 62. If desired, the casing may be formed with opposite flat, wrench-engaging surfaces 63 for facilitating connecting the coupling 61 to the casing. The casing 56 is formed with an internal, cylindrical bore 64 which, with the bore 65 through the part 57, forms a valve seat 66. Mounted for movement within the cylindrical bore 64 is a tubular valve member 68 formed at one end with a tapered shoulder 69 and adjacent its other end with a plurality of circumferentially-spaced vanes 70 of a diameter to slidingly guide the valve within the bore 64. The valve 68 at its tapered end 69 is formed with a bleeding passage 71 for a function which will presently appear. The valve is normally held unseated by a helical spring 72, which at one end bears upon the valve seat 66 and at its opposite end against inner ends of the vanes 70.

Operation

The female coupling unit 10 is normally connected to a cylinder (not shown) containing oxygen under super-atmospheric pressure and hence may be considered as fixed or stationary and, when so connected, the check valve 47 within the unit will engage the valve seat 45 by virtue of the super-atmospheric pressure acting thereon and by virtue, further, of the force of the helical spring 54 which biases the valve into seating relation. In order to open the valve 54 to establish the flow of oxygen from the cylinder (not shown) to its locale of use, the male coupling unit 11 is inserted into the bore of the female unit. To accomplish such coupling operation the locking sleeve 34 must first be withdrawn to the right in Fig. 1 to permit the balls to move radially outwardly, the extent of such movement of the sleeve 34 being limited by stops 73 mounted on the casing 13. With the locking sleeve thus withdrawn, the male coupling member is pushed inwardly until the reduced end 57 engages and moves past the O-ring 29 to engage and depress the cup-shaped member 51 to which the valve 47 is affixed, against the force of the spring 54 and the pressure of the oxygen in the chamber 15. When this is accomplished, the sleeve 34 is released, the cam surface 35 thereon forcing the balls 33 into the annular groove 59 thereby locking the male and female member in assembled relation and establishing fluid flow of the oxygen to the hose 62.

In order to disconnect the coupling unit 11, the sleeve 34 must again be withdrawn, whereupon, owing to the pressure of the oxygen and the force of the spring 54, the withdrawable male coupling unit is forcibly ejected from the female coupling unit. At the moment of disconnection, the pressure in the line downwardly from the coupling, that is, in the hose 62 will be above atmospheric pressure and will act on the tubular valve 68 to overcome the force of the spring 72 to seat the valve upon the seat 66. The fluid in the hose 62 is thus forced to escape through the bleeding orifice 71, the reduction in the escape velocity of the fluid thus preventing whipping of the hose 62 and preventing damage to articles in the environment, or even physical injury to the operator. When the back pressure in the hose 62 drops below the force of the spring 72, said spring will move the valve 68 off its seat 66 and the remaining fluid in the hose may then escape, but the pressure being now substantially reduced, no whipping of the hose will take place.

The valved coupling may also be employed for charging a cylinder with oxygen or other gas in the following manner: The male coupling unit 11 is inserted into the female unit 10 in the manner previously described and the valve from a supply source to the hose 62 is then opened. If the pressure differential between the refilling supply source and the oxygen cylinder is maintained below the force of the spring 72, said spring will be sufficient to keep the valve 68 off its seat 66 and as a result the flow through the male coupling unit will be unrestricted. However, when the pressure differential is greater than the force of the spring 72, the surge of pressure will first seat the valve 68 and the flow of fluid will be restricted to passage through the bleeding orifice 71. The size of the bleeding orifice, however, is usually of sufficient diameter to accomplish the task of refilling at high pressure differentials within a relatively short period of time.

Although we have shown and described a preferred embodiment of our invention, it is to be understood that the disclosure is illustrative of our invention and that changes in details of construction may be made thereto within the range of engineering skill, without departing from the spirit of the invention as claimed.

What we claim is:

1. In a valved coupling for a gas pressure system, a female coupling unit comprising a casing having a spring-biased check valve therein seating in the normal direction of fluid flow therethrough toward the discharge end of the casing, a male coupling unit comprising a casing with a bore therethrough, the entering end of said male casing being insertible into the discharge end of the casing of the female coupling unit to unseat the valve therein, said male coupling unit having a spring-biased valve normally held in unseated position, but seatable under gas pressure in a direction toward the insertable end thereof and means providing a fluid-tight seal between said casings when coupled together, the valve within the male coupling unit having a bleeding orifice therethrough.

2. A valved coupling according to claim 1, wherein the female coupling unit is relatively fixed and the male coupling unit is carried by a flexible hose, whereby, when gas under pressure is passing through the coupling from the female unit to the male unit and the male unit is uncoupled from the female unit, the back pressure of contained gas in the male unit and hose will seat the valve provided with the bleeding orifice in the male unit to restrict the rate of release of trapped gas from the male unit and prevent whipping of the flexible hose normally incident to the outrush of gas under pressure from the removable end of a fitting on a hose.

References Cited in the file of this patent

UNITED STATES PATENTS

| | | |
|---|---|---|
| 165,391 | Warker | July 6, 1875 |
| 2,092,116 | Hansen | Sept. 7, 1937 |
| 2,179,144 | Buttner | Nov. 7, 1939 |
| 2,322,462 | Marquardt | June 22, 1943 |
| 2,353,161 | Heigis et al. | July 11, 1944 |
| 2,367,662 | Baxter et al. | Jan. 23, 1945 |
| 2,386,270 | Samiran | Oct. 9, 1945 |
| 2,618,978 | Ragland | Nov. 25, 1952 |
| 2,661,764 | Johnson | Dec. 8, 1953 |